Patented Dec. 25, 1951

2,579,526

UNITED STATES PATENT OFFICE 2,579,526

PROCESS FOR THE FRACTIONATION OF COTTONSEED

Henry L. E. Vix, James J. Spadaro, Elisha F. Pollard, Edward A. Gastrock, and Ralph M. Persell, New Orleans, La., and Charles H. Murphey, Jr., Itta Bena, Miss., assignors to the United States of America as represented by the Secretary of Agriculture No Drawing. Application July 20, 1948, Serial No. 39,798

5 Claims. (Cl. 209—172)

(Granted under the act of March 3, 1883, as amended April 30, 1928; 370 O. G. 757)

This application is made under the act of March 3, 1883, as amended by the act of April 30, 1928, and the invention herein described, if patented in any country may be manufactured and used by or for the Government of the United States of America for governmental purposes throughout the world without the payment to us of any royalty thereon.

This invention relates to a process of preparing cottonseed meal substantially free from pigment glands, hulls, and oil.

Cottonseed meal is usually used for stock feed, but it is a potential source of protein for industrial use in the preparation of plastics, adhesives, sizes, and fiber. Unlike most other oilseeds, cottonseed contains a complex pigment system which, although it constitutes but 1–2% of the entire composition of the seed, is principally responsible for the characteristic color of the crude oil, and for rendering the meal undesirable as a source of a high-grade protein material for industrial utilization.

Hydraulic pressing, screw pressing, and solvent extraction with commercial hexane are the present industrial processes for obtaining crude oil and a meal product from cottonseed. The first two processes have been used for many years, whereas the solvent extraction process has been recently adopted by a few mills. These three processes produce a meal which contains all the hulls present in the original flakes and approximately 15, 10 and 3–5% of available oil in the seed, respectively.

The cake from hydraulic and screw pressing operation contains a large part if not most of the original pigments, whereas the hexane extracted meal contains a varying pigment content depending upon the method used in preparation of the flakes. The crude oil from all the processes can be refined, bleached and deodorized to produce prime oil, provided prime seeds are used.

In the solvent extraction process it is important that the removal of the commercial hexane from the cottonseed oil miscella be conducted under controlled conditions of temperature and reduced pressure in order to prevent color fixation during evaporation and stripping operations. In this process it is necessary to either cook the flakes prior to extraction or to heat the meal in the presence of moisture after extraction in order to partially detoxify the material before it can be used as a food or feed stuff. Other organic solvents, such as chlorohydrocarbons, diethyl ether, and alcohols have been proposed. The choice of solvent is significant since it may profoundly affect the pigments and their distribution between the meal and the oil. For example, if diethyl ether or acetone are used the pigments are largely removed from the meal and are present mostly in the oil miscella, whereas with such solvents as perchlorethylene and trichlorethylene nearly all the pigments stay within the meal and a small amount are present in the miscella.

The distribution of the pigments within the cottonseed kernel no doubt accounts for the fact that they are only partially removed by solvent extraction of the seed, even when solvents are used in which the pigments are known to be slightly soluble. Investigations have been conducted recently to determine the nature of the cottonseed pigments, their distribution in the seed and a possible method of their removal from the seed, meats or the meal. Evidence has been obtained of the presence in cottonseed of several pigments in addition to gossypol, the principal pigment. Most of these pigments are located in a gelatinous suspension enclosed by a thick rigid wall, and the entire system is commonly referred to as a pigment gland. The glands possess a high mechanical strength and appear not to be connected with the remainder of the tissue of the kernel. Microscopic examination reveals that the glands are spherical or ovoid shaped, and measure 100 to 250 microns in diameter. Hundreds of these glands are present in each kernel. Most of the color problems associated with cottonseed and its products can be attributed directly to these glands. A few solvents such as some of the chlorohydrocarbons and the low boiling petroleum cuts are relatively inactive toward the glands. However, water and some organic solvents rupture them.

An ideal method for the processing of cottonseed would be one in which practically all the pigment glands were removed intact from the meal and oil without being ruptured. The meal and oil would then be separated by conventional industrial methods, producing a meal of low oil content, practically free of deleterious pigments, and an oil easily refined to a light color.

We have discovered that in order to detach the pigment glands from 92 to 95% of the meal tissue in a slurry consisting of 1 gram of cottonseed flakes (solids only) to 1.5–1.8 cc. of solvent, such as commercial hexane, a disintegration is necessary which reduces 70% of the meal tissue to a size of 2 to 40 microns. Separation of the fine meal particles (2 to 40 microns) from the other solid components in the slurry can be obtained by taking advantage of the frictional resistance of the liquid medium, which produces a slower settling rate upon the smaller particles of meal tissue, 2 to 40 microns in size, as compared to those of the hulls, glands and larger meal tissue (larger than 40 microns). The effectiveness of the frictional resistance of the liquid medium on the fine meal particles is attributed mainly to two factors; the texture of these particles and their total area per unit weight. The hulls are dense and solid particles with relatively smooth surfaces. The pigment glands are ovoid shaped, compact particles having a surface which gives the gland a granular appearance. The large meal particles are irregular in shape, have a rough surface and a relatively small surface area per unit weight, whereas the fine meal particles, 2 to 40 microns in size have no definite shape and resemble a fluffy, feathery and amorphous material, and have a relatively large surface area per unit weight.

In disintegrated cottonseed meal slurries the hulls (sp. gr. above 1.45) settle out at once, the whole glands (sp. gr. below 1.36) settle slightly more slowly than the hulls, but the meal particles (sp. gr. 1.41 to 1.44), although of a higher density than the glands, settle at rates largely dependent upon their particle sizes. This was found to be true of slurries prepared either from undefatted flakes or defatted cottonseed meal in commercial hexane. Thus a settling time can be established, for any given set of conditions, which is required to obtain complete settling of the hulls and practically complete settling of the glands. It has been found that at the end of this period over 90% of the fine meal particles (2 to 40 microns) are yet in suspension while those larger than 40 microns have settled out at rates somewhat slower than the hulls and whole pigment glands.

A practically imponderable quantity of gland fragments, less than 0.25% of the total glands in the seed, remains suspended with the fine meal in the liquid medium, but this amount is negligible in practice.

Inert solvents, preferably of low viscosity, having a specific gravity in the range below 1.25 or above 1.55 can be used to effect separation of the fine meal from the other solid components in the disintegrated cottonseed slurry. We have found exceptionally suitable a low gravity medium ranging in specific gravity from 0.67 to 0.78. Solvents acceptable for the process are: petroleum ether, solvent naphtha, benzene, and such commercial cuts as normal heptane, normal pentane, normal hexane, cyclohexane, cyclopentane, 2-3-dimethylbutane, 2-methylpentane, methylcyclopentane, perchlorethylene, and other similar solvents, which meet the above specifications and have no rupturing effect on the pigment glands.

When using undefatted cottonseed flakes, the oil content of the slurry may reach at least 30% by weight without appreciably increasing the viscosity, and without affecting the yield of fine meal.

In the preparation of the cottonseed slurry by proper comminution of the flakes, the oil present in the seed forms a solution, or miscella with the solvent. Removal of the solids present in the liquid medium by methods described in this invention produces a clear miscella which is comparable in composition and quality to that produced by present industrial solvent extraction of cottonseed with commercial hexane.

On the basis of these discoveries we have developed two modifications of a method for producing, from either undefatted or defatted cottonseed, a meal fraction practically free of oil, pigment glands, and hulls, and consisting of 65 to 75% of the meal available in the original cottonseed.

One modification we have termed differential settling and the other centrifugal separation.

In the differential settling process a given quantity of cottonseed flakes is disintegrated in a slurry containing an organic solvent of low sp. gr. and low viscosity which does not rupture the pigment glands, such as commercial hexane. The disintegration reduces about 70% of the meal tissue to a size of 2 to 40 microns. It is then placed in a container of suitable size and shape, the percent solids adjusted by regulation of quantity of solvent added, and the slurry allowed to settle for a definite period of time. These conditions permit separation of the fine meal fraction which remains suspended in the liquid medium and the formation of a sediment containing the coarse meal particles larger than 40 to 50 microns, the hulls, and whole pigment glands. The suspension is separated from the sediment by syphoning or decanting. Each meal fraction is filtered, washed, and desolventized.

In the modification employing a centrifuge there are obtained a fine meal fraction essentially free of the other solid components, the yield of fine meal being somewhat less than for differential settling, and a coarse meal fraction containing all of the hulls and pigment glands.

By using slurries of the same composition as is described for differential settling, and employing a relative contrifugal force of about 50 R. C. F. (this signifies a centrifugal force of about 50 times gravity) and a time period normal to the operation of industrial continuous contrifuges, the fine meal particles remain suspended in the effluent, the hulls and glands being packed together with meal particles larger than 40 to 50 microns. Centrifugal force in the range of 2000 R. C. F. (being 2000 times gravity) separates 95% of the fine meal from the original effluent for undefatted material, and 98% of the fine meal from the original effluent for defatted meal.

After the original disintegration and differential settling or centrifugation steps, further disintegration of the coarse meal fraction followed by further differential settling or centrifugation can be used to enhance the total yield of fine meal.

The separation of the cottonseed meal slurry into fine meal and coarse meal fractions, as outlined in the two processes above, makes feasible the large scale production of pigment glands, relatively free of meal tissue, from the coarse meal fraction, using the mixed solvent flotation process.

The use of defatted flakes as feed material permits the use of the present invention in conjunction with a continuous solvent extraction system, the extracted, solvent-damp flakes being fed directly into the disintegration equipment. By this procedure, desolventization will be done only once, at the conclusion of the entire process.

Furthermore, since additional extraction of oil takes place during the subsequent disintegration and differential settling steps, the extracted flakes can be fed to the disintegrator at an oil content higher than would be permissible in emerging from present industrial solvent extraction processes. The reduction of the last 3 to 4% of oil in the flakes to a value below 1% occurs during the diffusion stage of extraction, which is the most lengthy, difficult, and expensive portion of the entire extraction. The capacity of the extractor equipment can be greatly increased if flakes are discharged at 3 to 4% oil content instead of 1%.

Nutritional investigations on poultry, using the defatted cottonseed flour, essentially free of pigment glands and hulls, have shown that with regard to protein quality it is superior to any other oilseed meal previously investigated and that the meal contains thermally unstable dietary essentials not found in other oilseed meats or in cottonseed meal prepared by the established methods of processing. The purified cottonseed meal has been used for the preparation of a synthetic fiber and its applicability for adhesives and sizes show promise.

Investigations have indicated potential pharmacological uses for the separated cottonseed pigment glands.

If removal of the glands from the coarse meal fraction, the sediment, is desired, this can be accomplished using the mixed solvent flotation process described in U. S. Patent No. 2,482,141, September 20, 1949. The amount of material used and solvent necessary would be only about 25% of that required were the original flakes, or meal, processed in that manner.

The processes are more specifically described as follows:

EXAMPLE I

Fifteen lbs. of cottonseed kernels were flaked in the usual industrial manner and dried in an atmospheric tray dryer to a moisture content of 3.8%. The flakes were mixed with 1½ gals. of commercial hexane and disintegrated, using a commercial type blender. A wet-screen analysis of the resulting slurry showed that 87.9% of the total meal tissue was fine enough to pass through an 80 mesh screen and 70.0% through a 300 mesh screen. The slurry contained 46.5% solids by weight on a defatted basis. A 50.0 gm. sample of this slurry was diluted with 352 ml. commercial hexane and mixed well. The resulting slurry contained 8.14% solids by weight and the miscella contained 4.86% oil by weight. It was poured into a large test tube and allowed to settle. As the sediment built up its depth was measured and recorded at regular time intervals. After two hours, all of the hulls and practically all of the glands were in the sediment, the meal suspension containing almost nothing but meal, which was essentially gland-free. Furthermore, it appeared that 40 minutes was sufficient time for practically all the hulls and glands to settle out. The slurry was re-mixed and allowed to settle for 40 minutes, after which the meal suspension was siphoned off and filtered on a Büchner funnel to recover the meal. The meal cake on the funnel was washed with commercial hexane to extract the residual oil and then de-solventized by vacuum-drying. The sediment, containing the glands, hulls, and coarse meal was also filtered, washed in commercial hexane to extract the oil, and de-solventized by vacuum-drying.

The weight of the fine, dry, gland-free meal cake was 12.19 gms. The weight of the dry sediment, containing the hulls, glands, and coarse meal, was 10.58 gms. This gave a recovery of 59.1% of the available meal in a form essentially free of glands and hulls.

The term "fine meal" will refer to the meal produced in this process, which is practically free of pigment glands, oil, and hulls, and is of such size that the particles stay in suspension in a light, non-viscous solvent for a longer time than do the hulls, glands, and coarse meal particles.

EXAMPLE II

A 50.0 gm. sample of the same slurry used in Example I was diluted with 352 ml. of commercial hexane, mixed well, and allowed to settle in a large test tube in the same manner as described in Ex. I. The meal suspension was withdrawn, filtered on a Büchner funnel, washed in commercial hexane to extract the residual oil, and de-solventized by vacuum drying. The sediment was re-mixed with fresh commercial hexane and allowed to settle an additional 40 minutes. The meal suspension was withdrawn and the fine meal recovered in the same manner as before. The sediment containing the glands, hulls, and coarse meal, was filtered, washed, and dried in the same manner as the fine meal. From this experiment the following fractions were obtained:

11.94 gms. fine meal, practically free of glands, in the 1st settling.

1.545 gms. fine meal, practically free of glands, in the 2nd settling.

9.79 gms. coarse meal, hulls, and glands.

The percentage of total meal recovered in the fine meal fractions (practically free of glands) was 64.0%. A microscopic examination of this meal showed that the particles ranged in size from about 2 to 4 microns up to about 50 microns, with the smaller sizes predominating.

EXAMPLE III

Seventeen pounds of dried hexane-extracted cottonseed flakes, produced in a continuous solvent extraction plant, were dried in an atmospheric tray dryer to a moisture content of approximately 4%. Five and one-half pounds of the flakes were then mixed with 1 gallon of commercial hexane and disintegrated, using a modification of a commercial type of blender. A screen analysis of the slurry showed that 62.8% of the total meal was 80 mesh or finer, and that 50.9% was 300 mesh or finer. The slurry contained 59.7% solids by weight on a defatted basis. A 75.9 ml. portion of the slurry was diluted with commercial hexane to a total volume of 372 ml. producing a dilute slurry that has a solvent-meal ratio of 400 ml. solvent to 50.0 gms. solids on a defatted basis. The slurry was mixed well and poured into a 30 mm. glass tube to settle. Depth of the slurry was 26.6 inches, by measurement. After 60 minutes the meal suspension was siphoned off and the sediment re-mixed with enough fresh hexane to make it up to its previous volume (372 ml.). After an additional 60 minutes of settling, the meal suspension was removed, yielding a second fine meal fraction. The sediment and the fine meal suspension were filtered, washed, and vacuum dried in the same manner. The following fractions were obtained from this experiment:

15.14 gms. fine meal, practically free of glands, 1st settling.

3.79 gms. fine meal, practically free of glands, 2nd settling.
28.86 gms. coarse meal, hulls, and glands.

The percentage of total meal recovered in the fine meal fractions, practically free of glands, was 38.3%. This experiment showed that poor yields are obtained when the original material is not sufficiently disintegrated.

EXAMPLE IV

Approximately 1200 ml. of a cottonseed meal slurry, prepared from hexane-extracted flakes which were disintegrated in commercial hexane using a modification of a commercial type blender, were wet-screened through an 80 mesh screen to remove the hulls and coarse meal. The resulting slurry contained 10.9% solids by weight. A portion of the slurry was poured into a 30 mm. settling tube, making a column of liquid 24" high. After mixing well, the slurry was allowed to settle for 135 minutes and the meal suspension withdrawn. The sediment was re-mixed with fresh hexane and resettled, producing another fine meal fraction. Both the meal suspension and the sediment were filtered on a Büchner funnel, washed with commercial hexane, and desolventized by vacuum drying, producing:

15.18 gms. fine meal from first settling.
2.69 gms. fine meal from second settling.
7.91 gms. coarse meal, hulls, and glands.

The percentage of total meal recovered in the fine meal fractions, practically free of glands, was 72.2%. This experiment shows that with a slurry containing only fine meal, as would be obtained with proper disintegration, a yield of fine, gland-free meal of 70 to 75% may be expected.

EXAMPLE V

A slurry was prepared from undefatted cottonseed flakes, using 4.8 lbs. of flakes and ½ gal. commercial hexane, disintegrating in the same blender as was used in Examples III and IV. The resulting slurry was wet screened through an 80 mesh screen to remove the hulls and coarse meal. A sample of the through portion was settled in a 30 mm. settling tube for 90 minutes. At the end of this time the fine meal suspension was siphoned off in six different flasks, taking a 4" section of the liquid in each. These six portions were diluted with perchlorethylene, making a sp. gr. of 1.378, and allowed to stand overnight. On the following day each of the diluted portions showed a trace of glands on its surface, but the amount on each varied, the portion taken from the top of the settling tube having the least amount of glands and the portion taken last from the tube having the most. No quantitative analysis was made but the results reported were easily determined by observation.

After the preceding experiments (Examples I to V) a series of tests was made to determine the effects of varying the time of settling, percent solids, and the difference in behavior of slurries prepared from defatted and undefatted flakes. Investigations were made to determine the feasibility of using the principles of centrifugation as a means of obtaining quicker separation of the fine, gland-free meal from the other components in a slurry instead of the differential settling procedure.

In the following examples (VI through XIII) two types of slurries were used, one from defatted and one from undefatted flakes. These slurries were used in Examples IV and V, and are unchanged, except where they are diluted to decrease the percent solids and oil. Both slurries were originally disintegrated in commercial hexane, using a modification of a commercial type blender, and wet screened through an 80 mesh screen to remove the hulls and coarse meal particles. A 30 mm. glass tube was used for all the differential settling examples. Only one removal of the fine meal suspension was made in each example, the fine meal which adhered to the coarse particles being reported as sediment.

The results shown in Table I prove that the yield of fine, gland-free meal, which is obtained from the meal suspension in differential settling of a disintegrated cottonseed meal slurry, varies inversely with the time of settling. The quantity of small gland fragments present in the fine meal was negligible.

Table I

EFFECT OF TIME OF SMELTING UPON THE YIELD OF FINE MEAL, GLAND-FREE

| Ex. No. | Constant Conditions | | | | Variables | |
|---|---|---|---|---|---|---|
| | Type of Slurry | Depth of Slurry | Per Cent Solids | Per Cent Oil | Time Settled | Per Cent Yield |
| | | Inches | | | Minutes | |
| VI | Defatted | 24 | 10.9 | None | 60 | 75.6 |
| VII | do | 24 | 10.9 | None | 135 | 72.2 |
| VIII | do | 24 | 5.0 | None | 60 | 77.6 |
| IX | do | 24 | 5.0 | None | 135 | 65.7 |
| X | Undefatted | 24 | 13.0 | 31.0 | 60 | 74.0 |
| XI | do | 24 | 13.4 | 31.6 | 135 | 70.5 |
| XII | do | 24 | 5.2 | 11.5 | 60 | 77.5 |
| XIII | do | 24 | 5.2 | 11.5 | 135 | 69.4 |

Table II

EFFECT OF PER CENT TOTAL SOLIDS ON THE YIELD OF FINE MEAL, GLAND-FREE

| Ex. No. | Constant Conditions | | | Variables | | |
|---|---|---|---|---|---|---|
| | Type of Slurry | Depth of Slurry | Time Settled | Per Cent Solids | Per Cent Oil | Per Cent Yield |
| | | Inches | Minutes | | | |
| XI | Defatted | 24 | 135 | 5.0 | None | 65.7 |
| VII | do | 24 | 135 | 10.9 | None | 72.2 |
| VIII | do | 24 | 60 | 5.0 | None | 77.6 |
| VI | do | 24 | 60 | 10.9 | None | 75.6 |
| XIII | Undefatted | 24 | 135 | 5.2 | 11.5 | 69.4 |
| XI | do | 24 | 135 | 13.4 | 31.6 | 70.5 |
| XII | do | 24 | 60 | 5.2 | 11.5 | 77.5 |
| X | do | 24 | 60 | 13.1 | 31.0 | 74.0 |

The above results indicate that the percent total solids and percent oil have little, if any effect, upon the settling rate or upon the percent yield of fine meal.

Table III

EFFECT OF TYPE OF SLURRY[1] ON THE YIELD OF FINE, GLAND-FREE MEAL

| Ex. No. | Constant Conditions | | | Variables | | |
|---|---|---|---|---|---|---|
| | Depth of Slurry | Time Settled | Per Cent Solids | Type of Slurry | Per Cent Oil | Per Cent Yield |
| | Inches | Minutes | | | | |
| XI | 24 | 135 | 13.4 | Undefatted | 31.6 | 70.5 |
| VII | 24 | 135 | 10.9 | Defatted | None | 72.2 |
| X | 24 | 60 | 13.1 | Undefatted | 31.0 | 74.0 |
| VI | 24 | 60 | 10.9 | Defatted | None | 75.6 |
| XIII | 24 | 135 | 5.2 | Undefatted | 11.5 | 69.4 |
| IX | 24 | 135 | 5.0 | Defatted | None | 65.7 |
| XII | 24 | 60 | 5.2 | Undefatted | 11.5 | 77.5 |
| VIII | 24 | 60 | 5.0 | Defatted | None | 77.6 |

[1] The type of slurry is either undefatted or defatted, depending upon the material used in the preparation. The per cent oil was not determined by analytical methods, but by calculation. These results show that the choice of either undefatted or defatted flakes for preparing a slurry has little effect on the percentage of fine meal produced.

In the following examples (Ex. XIV through XIX) centrifugation tests were made using an International Model PR-1 centrifuge. Samples of the defatted and the undefatted slurries employing the same slurries as were used in Examples VI through XIII, approximately 70 ml. each, were centrifuged in two steps; first, at a low relative centrifugal force, in the range of 50 to 100 R. C. F., which caused the glands, hulls, and coarse meal to settle out; then the effluent from the first step was centrifuged at 2000 R. C. F. Most of the fine meal, practically free of glands, was packed in the bottom of the tubes, leaving a final effluent which contained a small amount of fine meal in suspension.

The following tables show the effects of the different variables upon the yields of fine meal. The examples are not described individually in detail, but the conditions are specified in Tables IV and V in such a manner as to show the effect of varying certain conditions while holding the others constant. Some of the examples appear in more than one table.

Table IV
EFFECT OF RELATIVE CENTRIFUGAL FORCE ON THE YIELD OF FINE, GLAND-FREE MEAL

| Ex. No. | Constant Conditions | | Variables | |
|---|---|---|---|---|
| | Per Cent Solids | Per Cent Oil | Type Slurry | Initial RCF | Per Cent Yield |
| XIV | 12.4 | 29 | Undefatted | 50 | 65.1 |
| XV | 12.4 | 29 | do | 75 | 59.2 |
| XVI | 12.4 | 29 | do | 100 | 58.9 |
| XVII | 10.7 | None | Defatted | 50 | 63.0 |
| XVIII | 10.7 | None | do | 75 | 52.0 |
| XIX | 10.7 | None | do | 100 | 44.9 |

Table V
EFFECT OF TYPE OF SLURRY ON THE YIELD OF FINE, GLAND-FREE MEAL

| Ex. No. | Constant Conditions | | Variables | | |
|---|---|---|---|---|---|
| | Per Cent Solids | Initial RCF | Type Slurry | Per Cent Oil | Per Cent Yield |
| XIV | 12.4 | 50 | Undefatted | 29 | 65.1 |
| XVII | 10.7 | 50 | Defatted | None | 63.0 |
| XV | 12.4 | 75 | Undefatted | 29 | 59.2 |
| XVIII | 10.7 | 75 | Defatted | None | 52.0 |
| XVI | 12.4 | 100 | Undefatted | 29 | 58.9 |
| XIX | 10.7 | 100 | Defatted | None | 44.9 |

From the preceding results in centrifugation it was shown that a fine meal fraction practically free of pigment glands may be obtained by an initial centrifugation at approximately 50 R. C. F., followed by a final centrifugation of the effluent from the 1st centrifugation at 2000 R. C. F. or above. The yield of fine meal varies inversely as the R. C. F. of the initial centrifugation. The use of undefatted flakes as a starting material in preparing the slurry permits the use of a higher initial R. C. F. than would be permissible when using a slurry prepared from defatted flakes. This is due to the sharp decrease in the yield of fine meal, with increasing R. C. F., from a slurry containing no oil, therefore having a lower viscosity than a slurry prepared from undefatted flakes.

The purpose of Examples XX through XXIII is to compare the percentage of total glands in the fine meal fraction and in the sediment of a cottonseed meal slurry fractionated by centrifugal separation and by differential settling.

The slurry used in these examples was prepared from undefatted flakes, disintegrated in commercial hexane, using a modification of an industrial type blender. After disintegration the slurry was wet-screened through an 80 mesh screen to remove the hulls, and coarse meal. Two samples of the resulting slurry were centrifuged at 50 and at 100 R. C. F., respectively, followed by centrifugation of the effluent at 2000 R. C. F. to precipitate the fine, gland-free meal. The meal cake and the sediment were diluted with commercial hexane and perchlorethylene to a sp. gr. of 1.378 and allowed to settle for separation of the glands. The glands were recovered, washed in commercial hexane, vacuum dried, and weighed. They were then examined microscopically to determine the approximate percent purity. From the weight and estimated purity the actual weights of glands were determined. Then the percent of the total glands in each fraction was calculated. The weight of meal in each fraction was determined by filtering the slurries (after removal of glands), washing, and drying.

This experiment was performed in conjunction with a differential settling test on the same slurry. The settling times were 60 and 135 minutes respectively. At the ends of these times the meal suspensions were withdrawn, filtered, washed in commercial hexane, and vacuum dried. The sediments were processed in the same manner. After vacuum drying all fractions were weighed and re-mixed with $C_2Cl_4$ — commercial hexane, sp. gr. 1.378, for separation of the glands. These glands were removed from the surfaces of the slurries, washed and dried, weighed, and percent purity estimated to determine the actual weight of glands. The following table shows the yields of fine meal, practically gland-free, and the percentage of the total glands present in the fine meal and in the sediment.

Table VI

| Example No. | XX | XXI | XXII | XXIII |
|---|---|---|---|---|
| | Centrifugation | | Diff. Settling | |
| How processed | 50 R.C.F. | 100 R.C.F. | 60 min. | 135 min. |
| Wt. meal in final effluent, gms. | 0.205 | 0.19 | | |
| Wt. solids in fine meal cake | 3.43 | 2.48 | 22.13 | 20.18 |
| Wt. solids in sediment, gms. | 2.10 | 3.08 | 7.54 | 9.54 |
| Total wt. solids recovered, gms. | 5.735 | 5.75 | 29.67 | 29.72 |
| Wt. glands in meal cake, gms. | 0.000 | 0.000 | 0.002 | trace |
| Wt. glands in sediment, gms. | 0.10 | 0.16 | 0.86 | 0.86 |
| Total wt. glands recovered, gms. | 0.10 | 0.16 | 0.862 | 0.86 |
| Per cent glands in original solids | 1.74 | 2.78 | 2.89 | 2.89 |
| Per cent glands in sediment | 4.76 | 5.20 | 11.4 | 9.0 |
| Per cent of total glands in fine meal | 0.00 | 0.00 | 0.23 | 0.00 |
| Per cent of total glands in sediment | 100.00 | 100.00 | 99.77 | 100.00 |
| Per cent of total meal in final effluent | 3.61 | 3.40 | | |
| Per cent of total meal in meal cake | 60.9 | 44.4 | 76.8 | 69.9 |
| Per cent of total meal in sediment | 35.5 | 52.2 | 23.2 | 30.1 |
| Per cent total solids in slurry | 12.0 | 12.0 | 12.0 | 12.0 |

The above results show that by either centrifugation or by differential settling under the specified conditions, a fine meal fraction may be obtained that is practically free of glands and an enriched gland fraction is obtained that may be further processed for recovery of the glands if desired. Differential settling gives higher yields, but it may be possible to obtain comparable results by initial centrifugation below 50 R. C. F.

In the settling process it is preferable to employ slurries having an apparent viscosity no greater than 5 centipoises at 30° C.; the actual viscosity of the solvent medium should preferably not exceed 1.5 centipoises.

If the specific gravity of the solvent is below 1.25 the coarse solids, that is, the glands, hulls, and coarse meal, settle out. If the specific gravity is above 1.55, such as tetrachlorethylene, the coarse solids float to the surface, forming a layer over the meal suspension. In either case, the fine meal, practically free from glands remains suspended in the liquid medium.

Having thus described our invention we claim:

1. A process comprising subjecting cotton-seed meal that has been disintegrated in hexane to reduce at least 70 percent of the meal tissue to a size of from about 2 to 40 microns, the disintegration releasing the intact pigment glands, the meal tissue particles having a relatively large surface area, to separation by settling in a body of hexane, the settling being continued until the hulls and whole glands settle below, the fine particles of meal tissue remaining suspended in the hexane, and removing the suspension of fine particles substantially free from pigment glands, the whole pigment glands having a faster settling rate than the fine meal tissue, although having a lower specific gravity than the meal tissue remaining in suspension.

2. The process of claim 1 in which the cottonseed meal is defatted.

3. A process comprising disintegrating cottonseed in an organic liquid that does not rupture the pigment glands, to reduce at least 70 percent of the meal tissue to a size of about 2 to 40 microns, the meal tissue particles having a relatively large surface area, the whole pigment glands having a lower specific gravity than the fine meal particles; and mixing the disintegrated cotton-seed with an inert hydrocarbon liquid having a specific gravity below 1.25 and settling the whole glands and hulls, the fine particles of meal tissue, substantially free of pigment glands, remaining suspended in the liquid, and isolating this meal tissue as solids suspended in the liquid.

4. The process of claim 3 in which the cottonseed meal is defatted.

5. The process of claim 3 in which the hydrocarbon liquid has a specific gravity in the range 0.67 to 0.78.

HENRY L. E. VIX.
JAMES J. SPADARO.
ELISHA F. POLLARD.
EDWARD A. GASTROCK.
RALPH M. PERSELL.
CHARLES H. MURPHEY, Jr.

REFERENCES CITED

The following references are of record in the file of this patent:

UNITED STATES PATENTS

| Number | Name | Date |
|---|---|---|
| 2,132,484 | Kober | Oct. 11, 1938 |
| 2,482,141 | Boatner et al. | Sept. 20, 1949 |

OTHER REFERENCES

Richards and Locke: Textbook of Ore Dressing, 3rd edition, 1940, pages 128, 130, 470, 471, 472.

The Pigment Glands of Cottonseed by C. H. Boatner, Oil and Soaps, April 1946, vol. 23, pages 123 to 128.